3,647,595
METHOD FOR THE PRODUCTION OF DECORATIVE LAMINATES HAVING LOW TENDENCY TO FLAME-SPREADING
Nils B. Sundén, Perstorp, Sweden, assignor to Perstorp AB, Perstorp, Sweden
No Drawing. Filed July 8, 1968, Ser. No. 743,036
Claims priority, application Sweden, Sept. 1, 1967, 12,133/67
Int. Cl. C09j 3/14
U.S. Cl. 156—331                                      1 Claim

ABSTRACT OF THE DISCLOSURE

A process for the production of decorative laminates having core sheets and decorative overlay sheets which comprises
coating a core of phenol-formaldehyde resin impregnated paper sheets containing an amine-phosphate as a fire retardant
with a resin selected from the group consisting of melamine-formaldehyde resin and urea-formaldehyde resin having dispersed therein
at least one member selected from the group consisting of polyvinyl chloride and polyvinylidene chloride and
at least one member from the group consisting of antimony trioxide and alumina
and disposing said coated core sheets immediately adjacent to the lowermost of said decorative overlay sheets, said decorative overlay sheets comprising paper sheets impregnated with a resin selected from the group consisting of melamine-formaldehyde resin and urea-formaldehyde resin.

---

The present invention relates to a method for the production of decorative laminates having low tendency to flame-spreading and blazing. Such laminates are preferably used in ship-building where it is highly important that a fire does not spread causing a catastrophe.

The fire-technical judgement of surface covering material is made according to varying methods in different countries. The Swedish box method according to Statens Provningsanstalts statement No. 123 is among the most rigorous ones. Other methods are the German so-called Brandschlot method and the U.S. Underwriters Tunnel Test.

Decorative laminates for testing being glued on chip board or another wooden support can meet the fire requirements made according to said test methods if they are impregnated with phosphates or amine phosphates. Such laminates are further described in British Pat. 989,140. If the glueing, however, is made on a support having essentially lower heat conductivity or lower heat capacity, e.g. asbestos cement plates with a weight by volume of about 0.7 g./cm.³, acceptable results are not obtained. As the requirements for fire-resistance of panels to be used in ships or the like increase a very strong demand exists for producing panels which can be approved from all points of view.

The British patent specification No. 989,140 discloses that phosphates of amines and amino-alcohols having a carbon:nitrogen numerical ratio of 1:1 to 3:1 are soluble in resins such as the phenolic resins used for the manufacture of laminates, the solubility being so high that the standards with respect to flame-spread can be met by impregnating the paper in one step with a resin containing such phosphates. In this respect, the phosphates of amines and amino-alcohols differ from the known ammonium phosphates. Among the amine compounds showing these desirable properties are mono-di- and trimethylamine, monoethylamine, diethylenetriamine and ethanolamine.

According to the British patent specification, a method is provided for the manufacture of fire-resistant resin-impregnated material, particularly a plastic laminate, in which a phosphate of an amine having a carbon/nitrogen atom ratio of from 1:1 to not more than 3:1, is added to the resin used for impregnating the material before the impregnation is carried out. (The word "amine" herein is to be read as including amino-alcohol unless the context otherwise requires.) The phosphate is preferably used in amounts of 2 to 20% by weight, related to the weight of the finished impregnated material. These preferred phosphates are those in which the ratio of equivalence between amine and phosphoric acid lies between 0.4 to 1 and 0.85 to 1. The amine component may also contain other substitutes, such as hydroxyl and halogen, which do not actively take part in combustion. The amine phosphates can be used if desired in combination with known fireproofing substances.

In the British patent, a fire resistant impregnated material was made as follows:

A synthetic phenolic resin was produced from:

|  | Mols |
|---|---|
| Phenol | 1 |
| Formaldehyde | 1.2 |
| Water | 4.5 |
| Sodium hydroxide | 0.255 | in a condensation carried out at 80 to 100° C., and interrupted when the quantity of free formaldehyde in the reaction mixture had decreased to 20 g. per litre. After the resin solution had been cooled to 30° C., it was diluted with sulphite alcohol (crude alcohol) to a dry content of 40%, whereafter 10 parts monoethanolamine and, during cooling, about 10 parts phosphoric acid (85%) were added for every 100 parts of the resin so that the pH-value of the resin as measured with a glass electrode was 6.5. The resin obtained could be stored for more than thirty days without quality deterioration.

The resin was used for impregnating Kraft paper so that a resin content of 45%, calculated on the weight of the impregnated dried paper was obtained. (The loss of volatilisable substances during after-drying at 50° C. for 10 minutes was 5%.) This paper was used for building up the core of a sheet of decorative plastic laminate. The resulting product fulfilled with good margins the standard requirements with respect to flame spread, for example, those of Bulletin No. 123 of the official Swedish Materials-Testing Institute (Statens Provningstalt).

According to the present invention, the above-mentioned problems have been solved by producing decorative laminates built up in a way known per se on the basis of resin-impregnated paper sheets by arranging immediately below the uppermost decorative sheets impregnated preferably with melamine resin, one or some sheets which have been coated with a suspension of a chloric organic compound having at least 50 percent by weight of chlorine and a metallic oxide, which together with hydrochloric acid give a chloride with a boiling point (sublimation point) below 400° C. in a binding agent of the same type as is used in the decorative sheets. For the rest, the laminate can be produced in the conventional manner, i.e. on a core of phenol-formaldehyde resin impregnated sheets, melamine-formaldehyde resin impregnated blocking, decorative and surface layers are arranged. It is of course possible to use the present invention for modifications of conventional plastic laminates, e.g. ones having urea resin in their surface layers and other resins cheaper than phenolic resin in the core.

The suitable chloric organic compositions are polyvinyl chloride and polyvinylidene chloride and the metallic oxides antimony trioxide and alumina.

According to the present invention, the fire-retarding materials are applied in a simple way and without influencing the other properties of the decorative laminate, such as the appearance, tendency towards cracking or the like, which properties are highly sensitive to every variation in the entering components of the panel. The coated sheet/sheets are dried and fed into a press so that the coated side comes as close to the decorative sheets as possible. For the rest, the pressing is made in a way well-known within the art. When testing according to the box method with the laminated glued on an asbestos cement plate having a weight by volume of 0.7 g./cm.$^3$, a fire curve was obtained being within the surface specified for class I material.

The invention is further described in the following examples.

EXAMPLE 1

A core paper produced according to the British Pat. 989,140 is coated with a composition consisting of 10 parts by weight of PVC-powder, 10 parts by weight of antimony trioxide and 20 parts by weight of melamine-formaldehyde condensate (solid content 50%). The amount of coated material after drying was 70 g./m.$^2$. This coated paper was fed into a press together with conventional core papers and decorative papers of a type well-known within the art. The assembly was made in such a way that the coated surface came into contact with the outermost decorative sheet. After pressing at 140° C. and a pressure of 70 kp./cm.$^2$ during 40 minutes, the press was cooled and the laminate taken out. The panel had quite a normal appearance without any discolouring or other faults. When testing according to the box method with the laminate glued on an asbestos cement plate with a weight by volume of 0.7 g./cm.$^3$, a with a satisfactory margin approved fire curve for class I material was obtained.

EXAMPLE 2

A core paper produced according to the British Pat. 989,140 is coated with a composition consisting of 10 parts by weight of PVC-powder, 10 parts by weight of alumina hydrate and 20 parts by weight of a melamine-formaldehyde condensate (solid content 50%). The amount of coated material after drying was 70 g./m.$^2$. This coated paper was fed into a press together with core papers as mentioned above and decorative papers of known type. The assembly was made in such a way that the coated surface came into contact with the outermost decorative sheet. After pressing at 140° C. and a pressure of 70 kp./cm.$^2$ during 40 minutes, the press was cooled and the laminate taken out. The panel had quite a normal appearance without discolouring or other faults. When testing according to the box method with the laminate glued on an asbestos cement plate having a weight by volume of 0.7 g./cm.$^3$, a with a satisfactory margin approved fire curve for class I material was obtained.

I claim:

1. A process for the production of decorative laminates having core sheets and decorative overlay sheets which comprises
    coating a core of phenol-formaldehyde resin impregnated paper sheets containing an amine-phosphate as a fire retardant
    with a resin selected from the group consisting of melamine-formaldehyde resin and urea-formaldehyde resin having dispersed therein
    at least one member selected from the group consisting of polyvinyl chloride and polyvinylidene chloride and
    at least one member from the group consisting of antimony trioxide and alumina
    and disposing said coated core sheets immediately adjacent to the lowermost of said decorative overlay sheets, said decorative overlay sheets comprising paper sheets impregnated with a resin selected from the group consisting of melamine-formaldehyde resin and urea-formaldehyde resin.

References Cited

UNITED STATES PATENTS

| | | | |
|---|---|---|---|
| 3,271,335 | 9/1966 | Bostian et al. | 260—847 X |
| 3,322,716 | 5/1967 | Klein et al. | 260—45.7 |
| 3,383,267 | 5/1968 | Sunden | 156—335 |
| 3,034,939 | 5/1962 | Newkirk et al. | 156—333 X |
| 3,164,506 | 5/1965 | Lake | 156—69 |
| 3,333,970 | 8/1967 | Green | 106—15 |
| 3,449,194 | 6/1969 | Scheffler et al. | 156—331 |

CARL D. QUARFORTH, Primary Examiner

E. A. MILLER, Assistant Examiner

U.S. Cl. X.R.

156—333, 335; 161—403